United States Patent [19]

Miyajima et al.

[11] Patent Number: 4,942,458
[45] Date of Patent: Jul. 17, 1990

[54] COLOR LIQUID CRYSTAL DISPLAY APPARATUS

[75] Inventors: Akira Miyajima, Tokyo; Atushi Shiraishi; Yasuyuki Yoshida, both of Saitama, all of Japan

[73] Assignee: Citizen Watch Co., Ltd., Japan

[21] Appl. No.: 481,801

[22] Filed: Feb. 20, 1990

Related U.S. Application Data

[63] Continuation of Ser. No. 268,910, Nov. 8, 1988, abandoned.

[30] Foreign Application Priority Data

Nov. 10, 1987 [JP] Japan .................. 62-282229

[51] Int. Cl.⁵ .................. H04N 9/30; H04N 9/73
[52] U.S. Cl. .................. 358/29; 358/59
[58] Field of Search .................. 358/29, 59, 21 R, 236, 358/241

[56] References Cited

U.S. PATENT DOCUMENTS

4,581,654  4/1986  Kobayashi .................. 358/59
4,745,461  5/1988  Shirai .................. 358/59

Primary Examiner—Tommy P. Chin
Attorney, Agent, or Firm—Townsend and Townsend

[57] ABSTRACT

A color liquid crystal display apparatus includes a receiver, a color separation circuit, A/D converters, a liquid crystal panel, and an adjusting section. The receiver receives an external radio wave and outputs a video signal. The color separation circuit color-separates the video signal and outputs red, green, and blue video output signals. The A/D converters A/D-convert the red, green, and blue video output signals. The liquid crystal panel having a plurality of pixels formed therein displays an image on the basis of outputs from the A/D converters. The adjusting section can independently adjust at least one of low and high reference potentials used as references for A/D conversion by the A/D converters.

5 Claims, 9 Drawing Sheets

COLOR LIQUID CRYSTAL DISPLAY APPARATUS

This is a continuation division of application Ser. No. 07/268,910, filed Nov. 8, 1988, now abandoned.

BACKGROUND OF THE INVENTION

1. Field of the Invention

The present invention relates to a color liquid crystal display apparatus having a color saturation correcting circuit for red, green, and blue.

2. Description of the Prior Art

Recently, color liquid crystal television sets and color liquid crystal displays have been put into practice and widely used.

Figure 1:
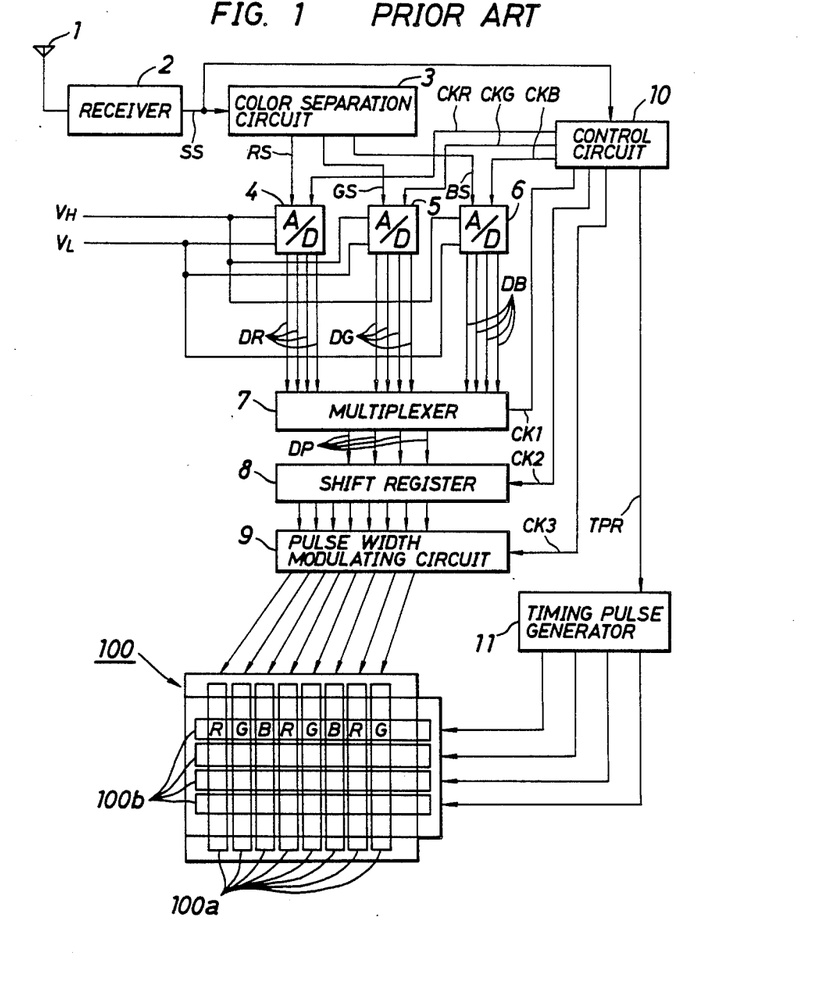
FIG. 1 is a block diagram showing a circuit diagram of a conventional color liquid crystal television set.

FIG. 1 is a block diagram showing a circuit arrangement of a conventional color liquid crystal television set.

Referring to FIG. 1, reference numeral 100 denotes a liquid crystal panel on which an image is displayed. The liquid crystal panel 100 is designed such that a liquid crystal is sealed between a substrate having signal electrodes 100a and a substrate having scanning electrodes 100b. The liquid crystal panel 100 further comprises color filters for color display. A matrix type panel is exemplified as liquid crystal panel 100, in which pixels are formed by cross portions between the signal and scanning electrodes 100a and 100b.

A flow of signals until an image is displayed on the liquid crystal panel 100 will be described below.

Reference numeral 1 denotes an antenna. When an external radio wave is received by the antenna, a video signal SS is formed by a receiver 2. The video signal SS is supplied to a color separation circuit 3, and is separated into a red (R) video output signal RS, a green (G) video output signal GS, and a blue (B) video output signal BS. The R, G, and B video output signals RS, GS, and BS are respectively A/D-converted by A/D converters 4, 5, and 6, and are output as 4-bit signals DR, DG, and DB. The reference potentials of each A/D converter are set to high and low reference potentials $V_H$ and $V_L$. The 4-bit signals DR, DG, and DB are arrayed by a multiplexer 7 in accordance with the arrangement of the color filters, and a 4-bit signal DP is output. The 4-bit signal DP is stored in a shift register 8. When data corresponding to one scanning operation is stored in the shift register 8, the stored data is supplied to a pulse width modulating circuit 9. The data which has been subjected to pulse width modulation in the pulse width modulating circuit 9 is supplied to the signal electrodes 100a of the liquid crystal panel 100.

The video signal SS is also supplied to a control circuit 10. The control circuit 10 generates clocks CKR, CKG, and CKB used in the A/D converters 4, 5, and 6, a clock CK1 used in the multiplexer 7, a clock CK2 used in the shift register 8, a clock CK3 used in the pulse width modulating circuit 9, and clock TPR to be supplied to a timing pulse generator 11. An output from the timing pulse generator 11 is received by the scanning electrodes 100b of the liquid crystal panel 100.

Figures 2A, 2B:
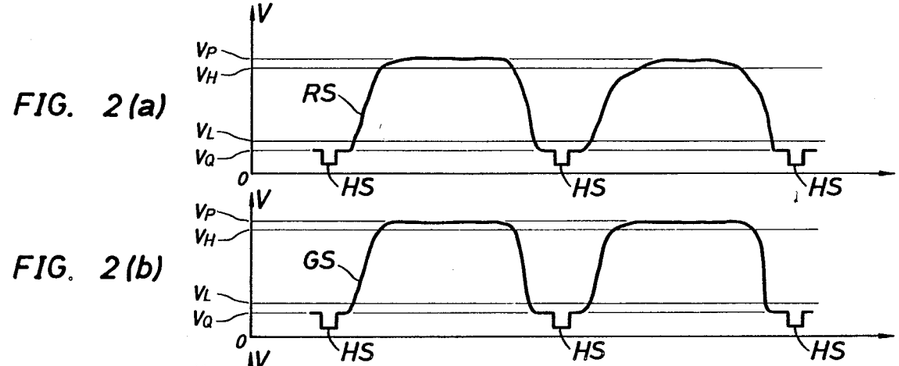
FIGS. 2(a), 2(b), and 2(c) are timing charts respectively showing relationships between the amplitudes of the R, G, and B video output signals and the reference potentials of A/D converters.
Figure 2C:
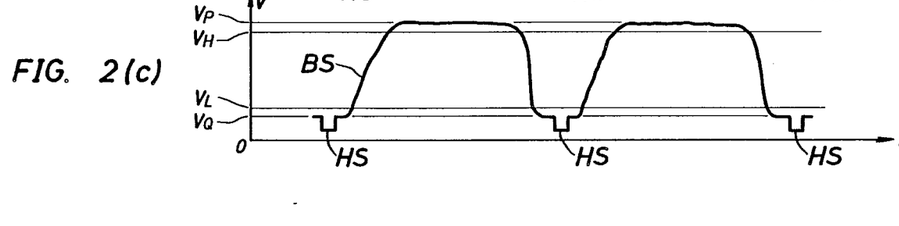

FIGS. 2(a), 2(b), and 2(c) respectively show relationships between the above-described R, G, and B video output signals RS, GS, and GB, and the high and low reference potentials $V_H$ and $V_L$. A time and a voltage are plotted along the axis of abscissa and the axis of the ordinate, respectively.

Reference symbol HS denotes a horizontal sync signal; $V_Q$, a pedestal level serving as a reference for each video output signal and representing the minimum value of each signal associated with gradation display; and $V_P$, the maximum value of each video output signal. $V_Q < V_L$, and $V_H < V_P$ are established for each video output signal.

Figure 3A:
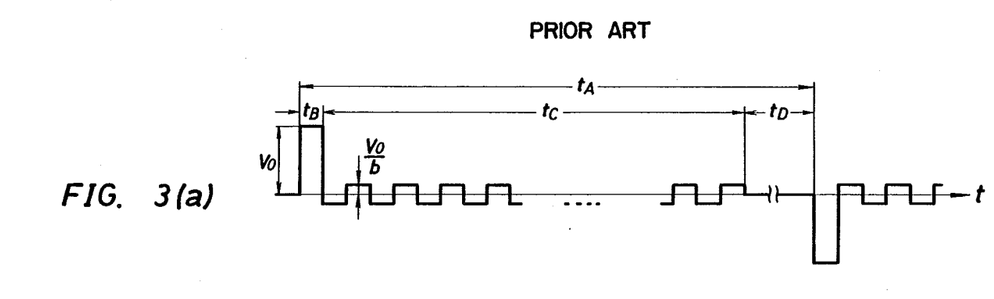
FIGS. 3(a), 3(b), and 3(c) are timing charts showing voltage drive waveforms when maximum, intermediate, and maximum RMS values are applied to each pixel in the conventional color liquid crystal television set, respectively.
Figure 3B:
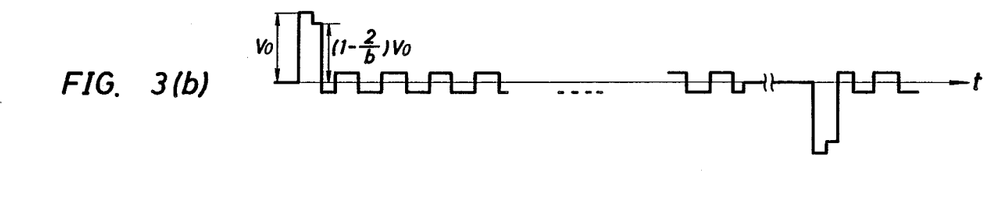
Figure 3C:
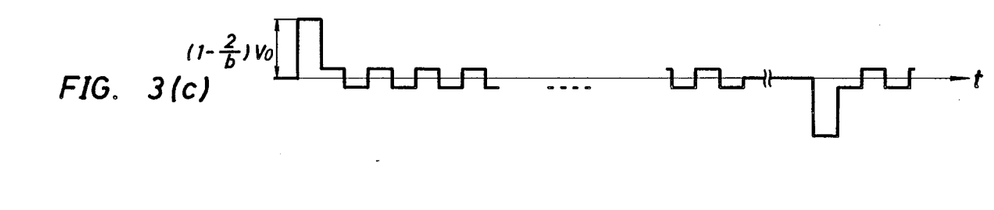

FIGS. 3(a), 3(b), and 3(c) respectively show voltage drive waveforms to be applied to the pixels formed on the first scanning electrode. FIG. 3(a) shows a voltage waveform when an ON voltage $\overline{V}_{ON}$ is applied to the pixels. FIG. 3(c) shows a voltage waveform when an OFF voltage $\overline{V}_{OFF}$ is applied to the pixels.

FIG. 3(b) shows a voltage waveform when a root-mean-square (RMS) voltage between the ON and OFF voltages $\overline{V}_{ON}$ and $\overline{V}_{OFF}$ is applied to the pixels. Reference symbol $t_A$ denotes a time period corresponding to one field; $t_B$, a selection period; $t_C$, a non-selection period; and $t_D$, a blanking period. Reference symbol $V_O$ denotes a voltage amplitude in the selection period; and b, a bias ratio obtained from the conditions for the maximum ratio of the ON voltage $\overline{V}_{ON}$ to the OFF voltage $\overline{V}_{OFF}$.

Figure 4:
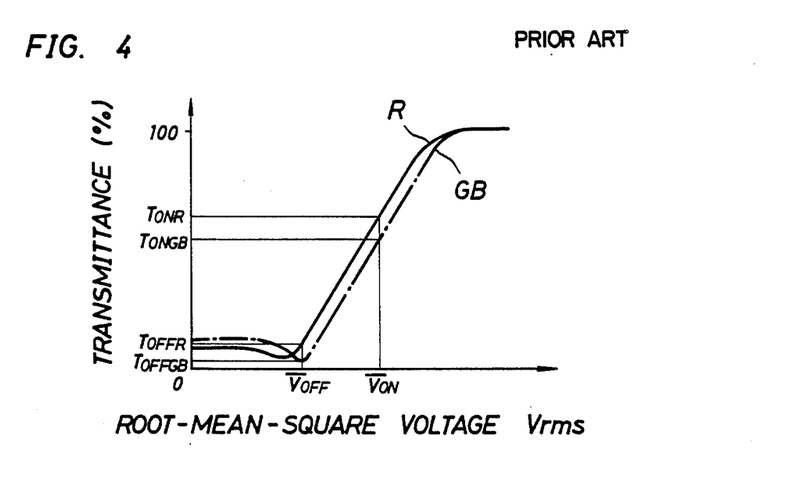
FIG. 4 is a graph of typical transmittance characteristics of a liquid crystal panel of the conventional color liquid crystal television set, showing a relationship between RMS voltages applied to the liquid crystal panel and transmittances.

FIG. 4 shows a change in transmittance T with respect to an RMS voltage $V_{rms}$ applied to the liquid crystal panel at a certain viewing angle. The axis of abscissa represents the RMS voltage $V_{rms}$ applied to the liquid crystal. The axis of ordinate represents a relative transmittance, assuming that a state wherein no light is transmitted is set to be a reference, and a state wherein a transmittance T is saturated upon increasing an applied voltage is set to be 100%. In FIG. 4, curves R and GB represent transmittance curves of R, and G and B pixels. The three transmittance curves R, G, and B do not necessarily coincide with each other. For example, a certain color pixel may be deviated from the other two color transmittance curves. FIG. 4 shows a case wherein the transmittance curve of an R pixel is different from the transmittance curves of G and B pixels. In the liquid crystal television set, a bright volume is arranged to change a drive voltage amplitude while the ratio of the ON voltage $\overline{V}_{ON}$ to the OFF voltage $\overline{V}_{OFF}$ is set substantially constant so as to obtain a clear display. When the bright volume is set to a position where an image can be displayed, the OFF voltage $\overline{V}_{OFF}$ for a display at the minimum transmittance is determined. In a liquid crystal display apparatus in which a time-divisional driving is performed, if the number of divisions is set to be N, the following relationship is obtained from the conditions for setting the maximum ratio of the ON voltage $\overline{V}_{ON}$ to the OFF voltage $\overline{V}_{OFF}$:

$$\overline{V}_{ON}/\overline{V}_{OFF} = \sqrt{(\sqrt{N} + 1)/(\sqrt{N} - 1)}$$

Therefore, if the OFF voltage $\overline{V}_{OFF}$ is determined, the ON voltage $\overline{V}_{ON}$ is automatically determined. In FIG. 4, $T_{OFFR}$ represents the transmittance of an R pixel and $T_{OFFGB}$ represents the transmittance of G and B pixels when the OFF voltage $\overline{V}_{OFF}$ is applied. In addition, $T_{ONR}$ and $T_{ONGB}$ respectively represent the transmittance of the R pixel, and the G and B pixels when the ON voltage $\overline{V}_{ON}$ is applied.

As described above, in order to apply the RMS voltage $\overline{V}_{OFF}$ in FIG. 4 to the pixels, the apparatus is required to be driven as shown in FIG. 3(c). The drive waveform in FIG. 3(c) is converted from a signal level $V \leq V_L$ in FIGS. 2(a), 2(b), and 2(c). In order to apply the RMS voltage $\overline{V}_{ON}$ in FIG. 4 to the pixels, the apparatus is required to be driven as shown in FIG. 3(a). The drive waveform in FIG. 3(a) is converted from a signal level V≧VH in FIGS. 2(a) and 2(b).

In the conventional color liquid crystal television set, however, the minimum transmittances of an R pixel, and G and B pixels are determined by the OFF voltage $\overline{V}_{OFF}$ as shown in FIG. 4, and the transmittances at this time are respectively set to be $T_{OFFR}$ and $T_{OFFGB}$.

In addition, the maximum transmittances of the R pixel, and the G and B pixels are determined by the ON voltage $\overline{V}_{ON}$, and the transmittances at this time are respectively set to be $T_{ONR}$ and $T_{ONGB}$. If a difference between $T_{OFFR}$ and $T_{OFFGB}$, or between $T_{ONR}$ and $T_{ONGB}$ is increased, the saturation of R and B will be different from each other and the saturation of G and B will also be different from each other. This poses a problem that a natural image cannot be obtained. More specifically, if the reference potentials for the liquid crystal panel in FIG. 4 are set as shown in FIG. 2, the overall display image is tinged with red. This phenomenon becomes most noticeable when an image is displayed upon reception of a white raster signal. This is caused mainly by a difference between $T_{ONR}$ and $T_{ONGB}$.

In FIG. 4, the transmittance curves of the G and B pixels exhibit the same characteristic. However, even if the transmittance curves of the R, G, and B pixels exhibit different characteristics, a similar problem is posed.

In mass production, since the thickness and spectral characteristics of color filters interposed between signal and scanning electrodes vary, the transmittance curves of R, G, and B may differ from the respective preset values, and hence are required to be electrically corrected.

SUMMARY OF THE INVENTION

It is an object of the present invention to provide a color crystal liquid display apparatus having a color saturation correcting mechanism for R, G, and B.

According to a color liquid crystal display apparatus of the present invention, when the R, G, and B video output signals are A/D-converted, at least one of low and high reference potentials can be independently adjusted as a reference for A/D conversion.

DETAILED DESCRIPTION OF THE PREFERRED EMBODIMENTS

Embodiments of the present invention will be described in detail below with reference to the accompanying drawings.

FIGS. 5 to 11 show a color liquid crystal television set as a color liquid crystal display apparatus according to an embodiment of the present invention.

Figure 5:
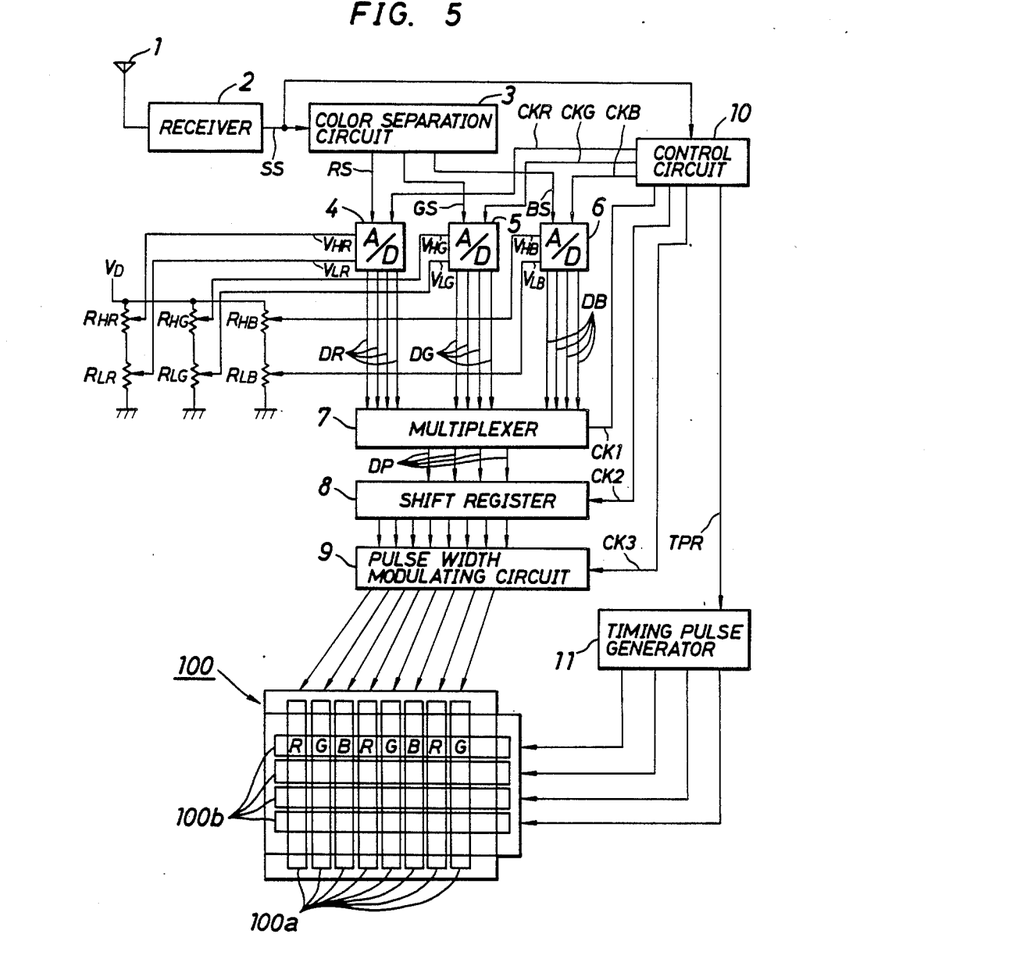
FIG. 5 is a block diagram showing a circuit arrangement of a color liquid crystal display apparatus according to an embodiment of the present invention.

FIG. 5 is a block diagram showing a circuit arrangement of the liquid color display apparatus according to the embodiment of the present invention. The same reference numerals in FIG. 5 denote the same parts as in FIG. 1.

A video signal SS is supplied to a color separation circuit 3, and is separated into R, G, and B video output signals RS, GS, and BS.

The R, G, and B video output signals RS, GS, and BS are A/D-converted, and are output as 4-bit signals DR, DG, and DB, respectively. The maximum and minimum levels in A/D conversion of the R video output signal are respectively set to high and low reference potentials $V_{HR}$ and $V_{LR}$ by changing variable resistors $R_{HR}$ and $R_{LR}$. The maximum and minimum levels in A/D conversion of the G video output signal are respectively set to high and low reference potentials $V_{HG}$ and $V_{LG}$ by changing variable resistors $R_{HG}$ and $R_{LG}$.

The maximum and minimum levels in A/D conversion of the B video output signal are respectively set to high and low reference potentials $V_{HB}$ and $V_{LB}$ by changing variable resistors $R_{HB}$ and $R_{LB}$.

A description after the 4-bit signals DR, DG, and DB output from A/D converters 4, 5, and 6 are supplied to a multiplexer 7 is the same as that in FIG. 1.

Figure 6:
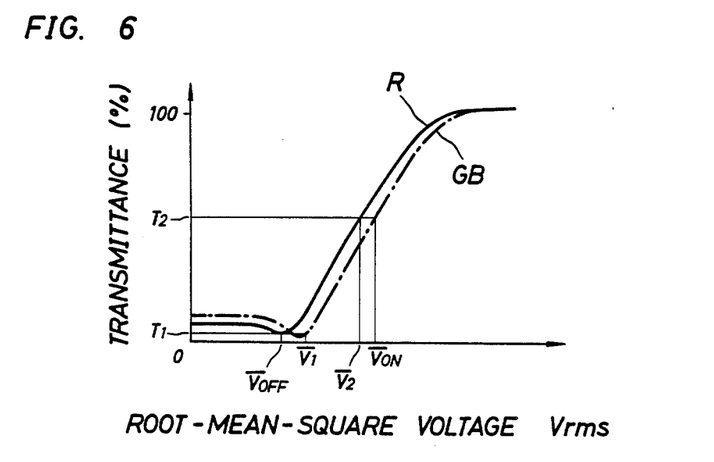
FIG. 6 is a graph of transmittance characteristics of a liquid crystal panel of the color liquid crystal display apparatus of the present invention, showing a relationship between RMS voltages applied to the liquid crystal panel and transmittances.

FIG. 6 shows a change in transmittance with respect to RMS voltages applied to a liquid crystal panel of the color liquid crystal display apparatus. The axes of abscissa and ordinate, and curves R and GB in FIG. 6 represent the same as in FIG. 4.

It will be described how variable resistors $R_{HR}$, $R_{LR}$, $R_{HG}$, $R_{LG}$, $R_{HB}$, and $R_{LB}$ are set as described in FIG. 5 so as to perform an image display with excellent color balance by exemplifying the color liquid crystal display apparatus having the liquid crystal panel exhibiting the liquid crystal characteristics shown in FIG. 6.

As described in FIG. 4, if the bright volume is et to a certain position, the OFF and ON-voltages $\overline{V}_{OFF}$ and $\overline{V}_{ON}$ as the minimum and maximum values in a voltage applicable range are respectively determined. The application ranges of voltages are differently set for R, and G and B so as to set substantially the same application range of transmittances of the transmittance curve of the R pixel and that of the G and B pixels. More specifically, the range of $\overline{V}_{OFF} \leq \overline{V} \leq \overline{V}_2$ is used for the transmittance curve R, and the range of $\overline{V}_1 \leq \overline{V} \leq \overline{V}_{ON}$ is used for the transmittance curve GB so as to set the transmittances of R, G, and B to be changed in the range of $T1 \leq T \leq T2$. This setting is performed by changing and adjusting the variable resistors $R_{HR}$, $R_{LR}$, $R_{HG}$, $R_{LG}$, $R_{HB}$, and $R_{LB}$ so as to determine the reference potentials $V_{HR}$, $V_{LR}$, $V_{HG}$, $V_{LG}$, $V_{HB}$, and $V_{LB}$.

Figure 7A:
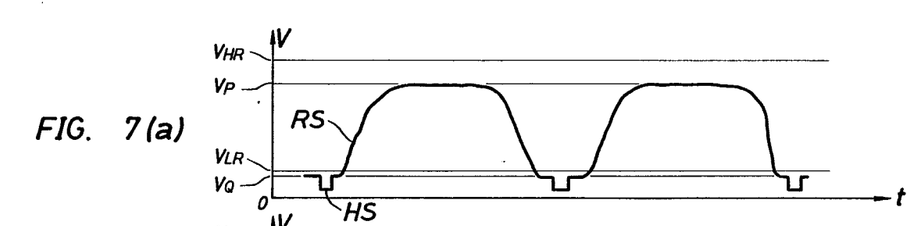
FIGS. 7(a), 7(b), and 7(c) are timing charts showing relationships between the amplitudes of the R, G, and B video output signals in the color liquid crystal display apparatus of the present invention and the reference potentials of A/D converters.
Figure 7B:
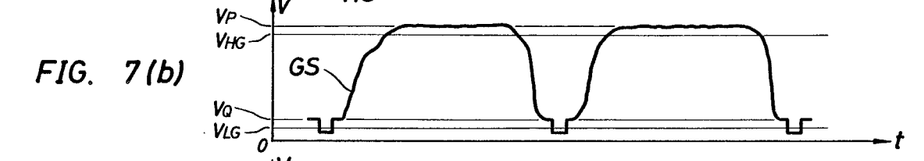
Figure 7C:
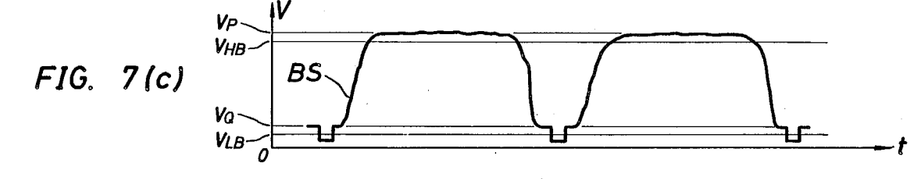

FIGS. 7(a), 7(b), and 7(c) show relationships between the amplitudes of the respective video output signals described in reference to FIG. 5 and the reference potentials. The same reference symbols in FIGS. 7(a) to 7(c) denote the same as in FIG. 2.

In FIG. 7(a), reference symbol RS denotes the R video output signal, for which the high and low reference potentials $V_{HR}$ and $V_{LR}$ are set as references for A/D conversion. In FIG. 7(b), reference symbol GS denotes the G video output signal, for which the high and low reference potentials $V_{HG}$ and $V_{LG}$ are set as references for A/D conversion. In FIG. 7(c), reference symbol BS denotes the B video output signal, for which the high and low reference potentials $V_{HB}$ and $V_{LB}$ are set as references for A/D conversion. Reference symbol $V_Q$ denotes a minimum value of a signal component of each video output signal, which is associated with a gradation display; and $V_P$, a maximum value of the signal component. In FIGS. 7(a), 7(b), and 7(c), $V_{HR} > V_P$, $V_{LG} < V_Q$, and $V_{LB} < V_Q$ are set. A signal 7(c), VHR >VP, VLG <VQ, and VLB <V level of $V_Q \leq V \leq V_{LR}$ corresponds to a minimum RMS voltage $\overline{V}_{OFF}$ (OFF voltage) applied to each R pixel, whereas a signal level of $V = V_P$ corresponds to a maximum RMS voltage $\overline{V}_2$ applied to each R pixel.

Signal levels of $V = V_Q$ and $V_{HG} \leq V \leq V_P$ correspond to minimum and maximum RMS voltages $\overline{V}_1$ and $\overline{V}_{ON}$ (ON voltage) applied to each G pixel. Signal levels of $V = V_Q$ and $V_{HB} \leq V \leq V_P$ respectively correspond to minimum and maximum RMS voltages $\overline{V}_1$ and $\overline{V}_{ON}$ (ON voltage) applied to each B pixel.

The types of drive waveforms used to obtain the above-described RMS voltages $\overline{V}_{ON}$, $\overline{V}_2$, $\overline{V}_{OFF}$, and $\overline{V}_1$ will be described with reference to FIGS. 8(a), 8(b), 8(c), and 8(d).

FIGS. 8(a), 8(b), 8(c), and 8(d) show voltage drive waveforms applied to the pixels formed on the first scanning electrode. The same reference symbols in FIGS. 8(a) to 8(d) denote the same as in FIG. 3.

Figures 8A, 8B:
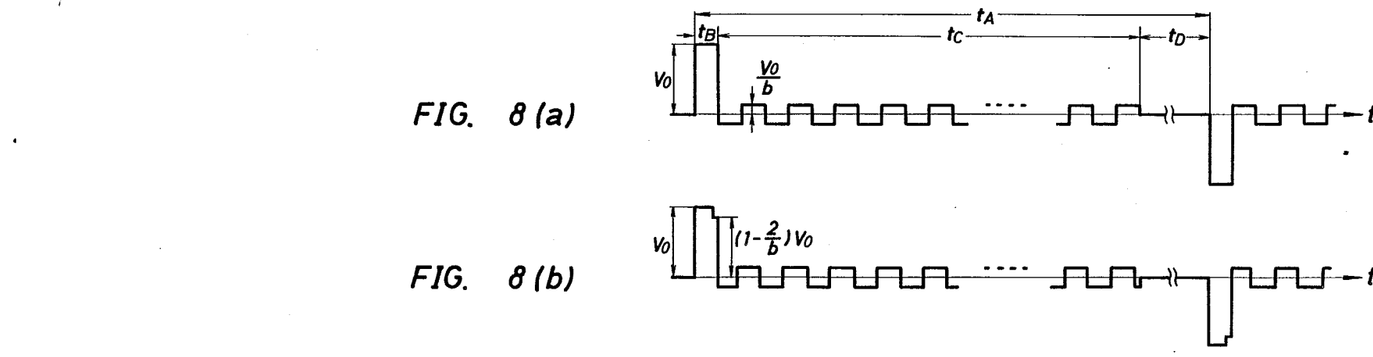
FIGS. 8(a) and 8(b) are timing charts showing voltage drive waveforms when a maximum RMS voltage is applied to G and B pixels, and an R pixel in the color liquid crystal display apparatus of the present invention.
Figures 8C, 8D:
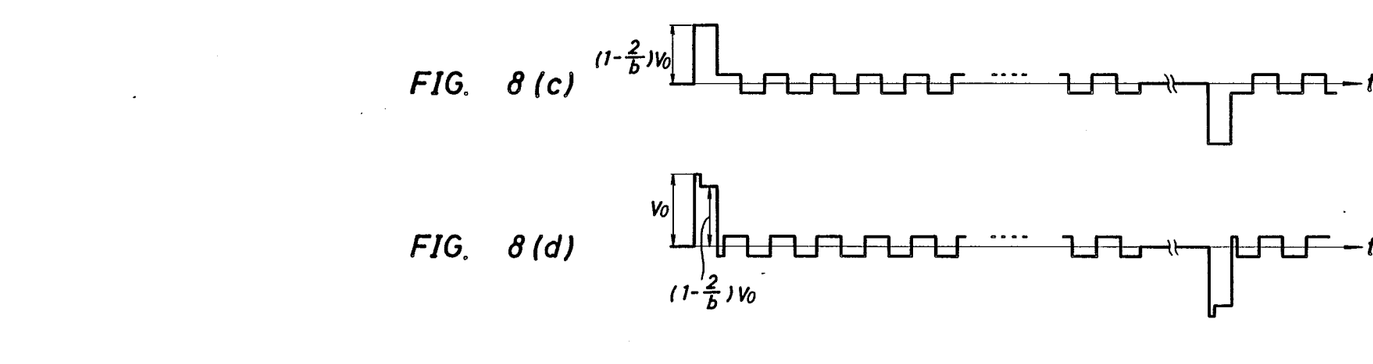
FIGS. 8(c) and 8(d) are timing charts showing voltage drive waveforms when a minimum RMS voltage is applied to an R pixel, and G and B pixels in the color liquid crystal display apparatus of the present invention.

FIG. 8(a) shows the voltage waveform when the ON voltage $\overline{V}_{ON}$ is applied to G and B pixels. FIG. 8(b) shows the voltage waveform when the RMS voltage $\overline{V}_2$ is applied to an R pixel. A difference between the waveforms in FIGS. 8(a) and 8(b) corresponds to a difference the RMS voltages $\overline{V}_{ON}$ and $\overline{V}_2$ in FIG. 6. FIG. 8(c) shows the voltage waveform when the OFF voltage $\overline{V}_{OFF}$ is applied to the R pixel. FIG. 8(d) shows the voltage waveform when the RMS voltage $\overline{V}_1$ is applied to the G and B pixels. A difference between the waveforms in FIGS. 8(d) and 8(c) corresponds to a difference between the RMS voltages $\overline{V}_1$ and $\overline{V}_{OFF}$ in FIG. 6.

The reference potentials of the A/D converters for R, G, and B are independently set in this manner so that minimum transmittances T1, and maximum transmittances T2 can be set to be substantially equal, respectively, for R, G, and B.

Figure 9:
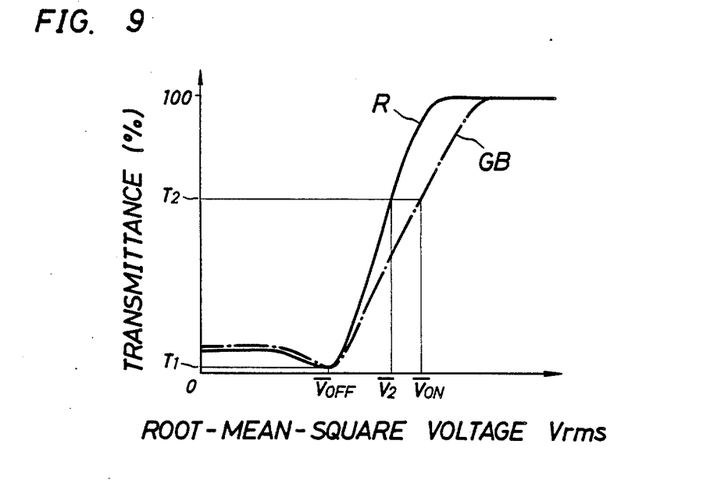
FIGS. 9 and 10 are graphs of different transmittance characteristics of liquid crystal panels, respectively showing relationships between RMS voltages applied to the liquid crystal panels and transmittances.

FIG. 9 shows transmittance characteristics of a liquid crystal panel different from those shown in FIG. 6.

In order to display an image on the liquid crystal panel having such transmittance characteristics with excellent color balance, the range of $\overline{V}_{OFF} \leq \overline{V} \leq \overline{V}_2$ is used for the transmittance curve R, and the range of $\overline{V}_{OFF} \leq V \leq \overline{V}_{ON}$ is used for the transmittance curve GB. In order to achieve this state, reference potentials are set to satisfy $V_{LR} = V_{LG} = V_{LB}$ and $V_{HR} > V_{HG} = V_{HB}$ by adjusting the variable resistors $R_{HR}$, $R_{LR}$, $R_{HG}$, $R_{LG}$, $R_{HB}$, and $R_{LB}$ in FIG. 1. In this manner, a transmittance can be changed within the range of $T1 \leq T \leq T2$ for each of R, G, and B pixels.

Figure 10:
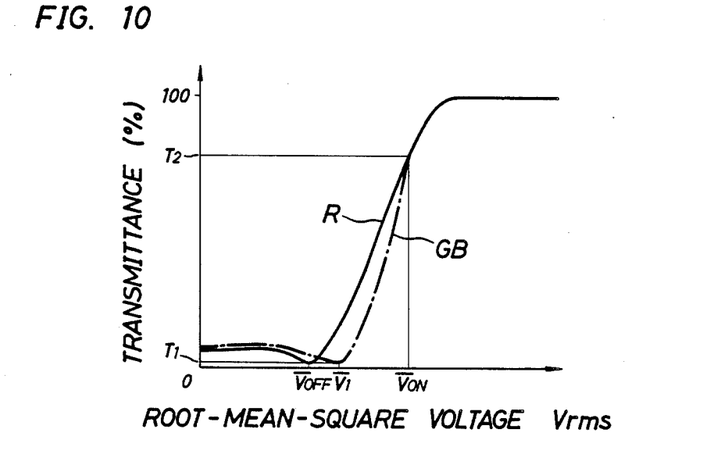

In order to display an image with excellent color balance on a liquid crystal panel having transmittance characteristics shown in FIG. 10, which are different from those of the above-described panels, the range of $\overline{V}_{OFF} \leq V \leq \overline{V}_{ON}$ is used for the transmittance curve R, and the range of $\overline{V}_1 \leq V \leq \overline{V}_{ON}$ is used for the transmittance curve GB. This state can be achieved by setting reference potentials to satisfy $V_{LR} > V_{LG} = V_{LB}$ and $V_{HR} = V_{HG} = V_{HB}$ by adjusting the variable resistors $R_{HR}$, $R_{LR}$, $R_{HG}$, $R_{LG}$, $G_{HB}$, and $R_{LB}$. In this manner, a transmittance can be changed within the range of $T1 \leq T \leq T2$ for each of R, G, and B pixels.

The above description is associated with a case wherein the transmittance curve of the R pixel is deviated from the transmittance curve of the G and B pixels. However, when, for example, the transmittance curve of the G pixel is deviated from the transmittance curve of the R and B pixels, adjustment can be performed in the same manner. In addition, the present invention can be applied to a case wherein the transmittance curves of the three pixels are different from each other.

Figure 11:
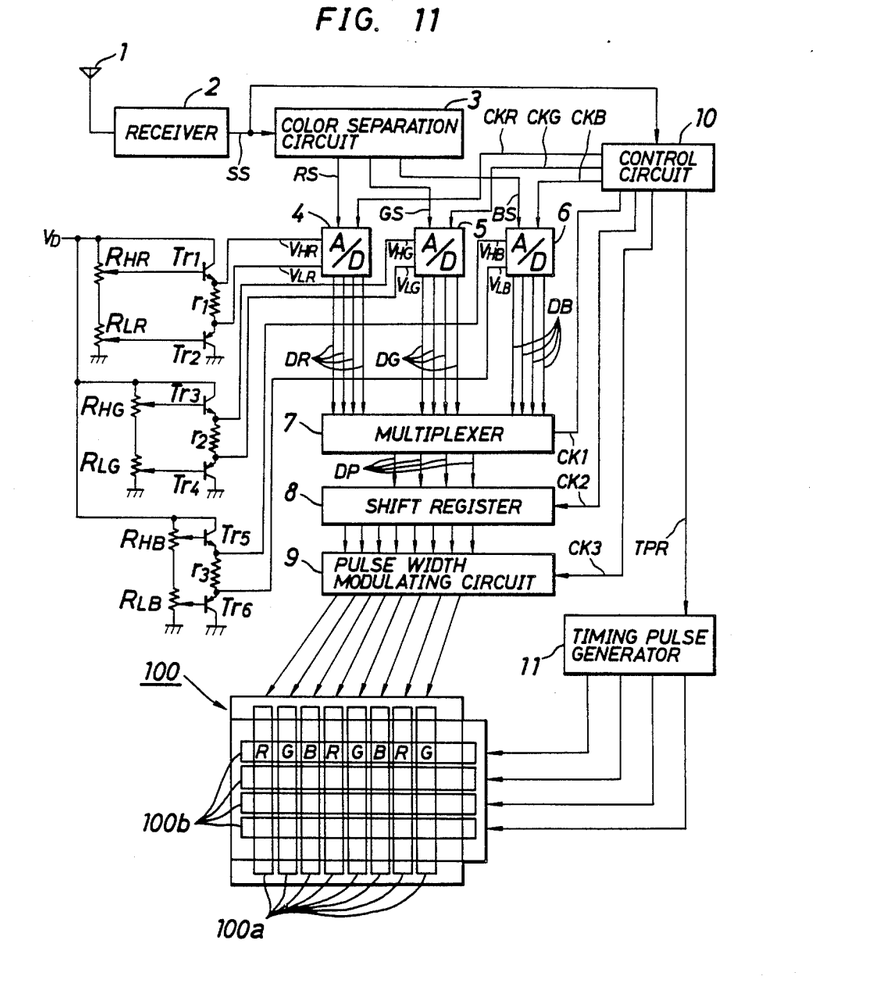
FIG. 11 is a block diagram showing a circuit arrangement of a color liquid crystal display apparatus according to another embodiment of the present invention.

FIG. 11 shows a circuit arrangement of a color liquid crystal display apparatus according to another embodiment of the present invention. The same reference numerals in FIG. 11 denote the same parts as in FIG. 5.

In this embodiment, a combination of variable resistors, transistors, and resistors is used to adjust the reference potentials of A/D converters 4, 5, and 6. More specifically, for the A/D converter 4, variable resistor $R_{HR}$ for adjusting the high reference potential, variable resistor $R_{LR}$ for adjusting the low reference potential, two transistors $T_{r1}$ and $T_{r2}$, and resistor $r_1$ are used. Similarly, for the A/D converter 5, variable resistors $R_{HG}$ and $R_{LG}$, transistors $T_{r3}$ and $T_{r4}$, and resistor $r_2$ are used. For the A/D converter 6, variable resistors $R_{HB}$ and $R_{LB}$, transistors $T_{r5}$ and $T_{r6}$, and resistor $r_3$ are used.

With this circuit arrangement, an emitter follower circuit is formed by connecting a variable point of each variable resistor to the base of a corresponding transistor so as to decrease an output resistance, thereby stabilizing each reference potential.

A method of adjusting a reference potential using each variable resistor is the same as that described in FIGS. 5 to 10.

The present invention has been described by exemplifying the matrix type liquid crystal panels. However, the present invention can be equally applied to a case wherein an active type liquid crystal panel having active elements as pixels is used.

As is apparent from the above description, according to the color liquid crystal display apparatus of the present invention, the reference potentials of the A/D converters for R, G, and B are independently set so that the minimum and maximum transmittances of R, G, and B pixels can be independently changed. As a result, when the transmittance curves of the R, G, and B pixels of the liquid crystal panel are different from each other, since the minimum transmittances and the maximum transmittances can be respectively set to be equal, excellent color balance is obtained, and saturations of R, G, and B become uniform, thereby reproducing natural colors.

In order to prevent an image in which a specific color is excessively emphasized, e.g., an image tinged with red, only the maximum transmittances for R, G, and B may be set to be equal. This operation can be performed by setting the low reference potentials for R, G, and B, which are used to determine minimum transmittances, at the same level, and setting the high reference potentials at different levels for R, G, and B. Thus, technical advantages can be obtained in which color balance can be adjusted according to the characteristics of a liquid crystal panel.

When differences between the transmittance curves of R, G, and B are relatively large, nonuniformity of colors can be reduced by adjusting minimum transmittances and maximum transmittances, respectively, in a direction to cause them approach each other without setting them to be substantially equal.

In mass production, a variation in thickness and spectral characteristic of color filters disposed in liquid crystal panels is caused. However, such a variation can be canceled by performing the above-described adjustment according to the characteristic of respective liquid crystal panels. Especially, in the color liquid crystal display apparatus of the present invention, if the variable resistors for setting the reference potentials are arranged in a driving circuit, and the above adjustment is performed when the liquid crystal panel and the driving circuit are combined with each other, image quality can be checked.

What is claimed is:

1. An apparatus for adjusting color balance to match the characteristics of a color liquid crystal display comprising:
   a receiver for receiving an external radio wave and outputting a video signal;
   a color separation circuit for color-separating the video signal and outputting red, green, and blue video output signals;
   a separate A/D converter for A/D-converting each of the separate red, green, and blue video output signals and outputting separate red, green, and blue digital output signal;
   a liquid crystal panel, having a plurality of pixels formed therein, for displaying an image on the basis of the red, green, and blue digital output signals generated by each said A/D converter; and
   adjusting means which can independently adjust both the low and high reference potentials used as references for A/D conversion of each of the red, green, and blue video output signals by each said A/D converter.

2. An apparatus according to claim 1, wherein said adjusting means is capable of continuously changing both of the reference potentials for each of the red, green, and blue video output signals.

3. An apparatus according to claim 2, wherein said adjustment means comprises a circuit including a separate variable resistor for each of the reference potentials.

4. An apparatus according to claim 1, wherein one of the high and low reference potentials of said A/D converter is constant.

5. An apparatus according to claim 1, wherein said liquid crystal panel forms said plurality of pixels for a matrix display by using a plurality of signal electrodes and a plurality of scanning electrodes.

* * * * *